April 8, 1958 — A. A. STUDLER — 2,829,384
BEE SWARM COLLECTOR
Filed May 28, 1954 — 2 Sheets-Sheet 1

AURELE A. STUDLER
INVENTOR.

BY *Francis D. Ammer*

ATTORNEY

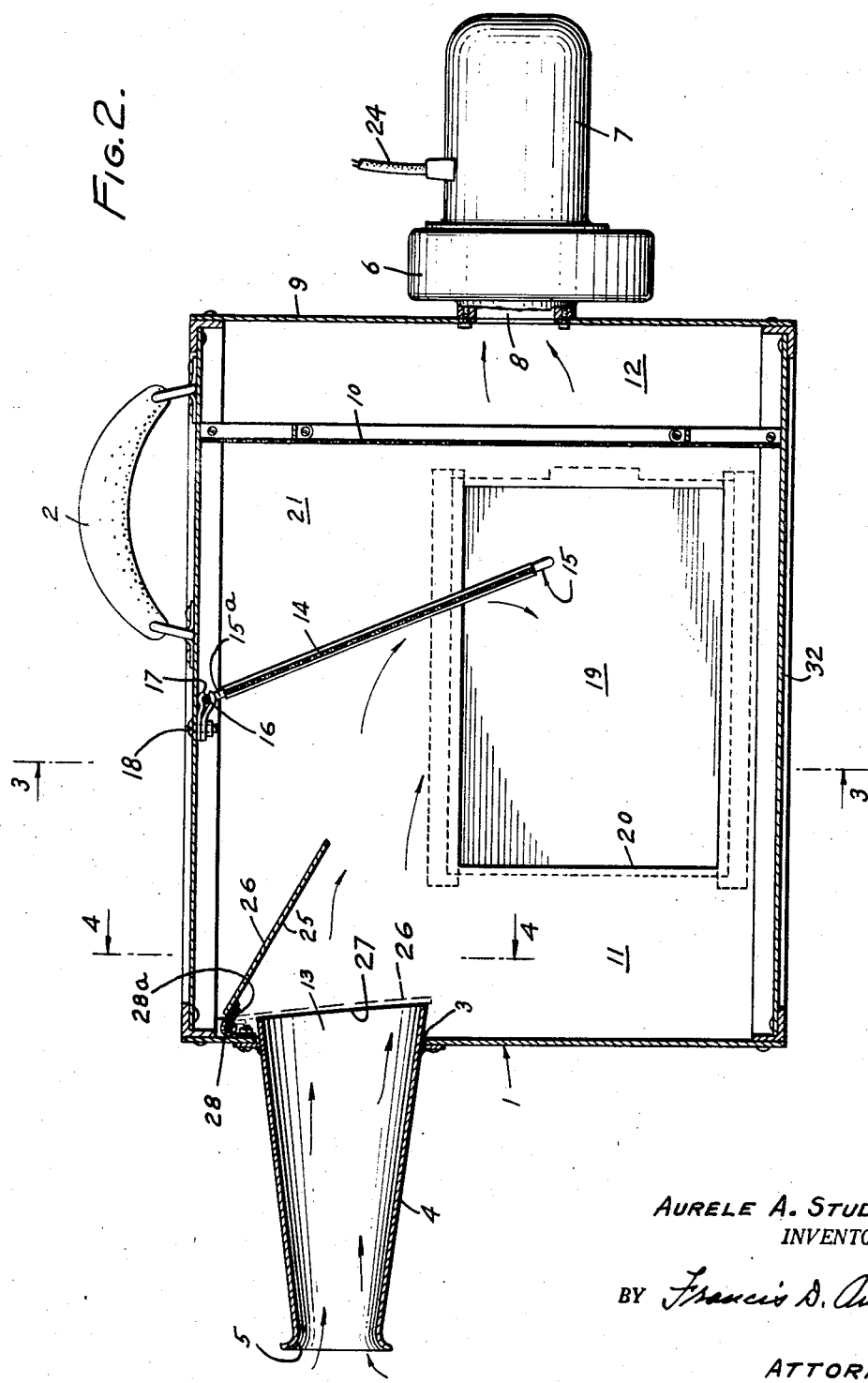

United States Patent Office 2,829,384
Patented Apr. 8, 1958

2,829,384

BEE SWARM COLLECTOR

Aurele A. Studler, Glendale, Calif.

Application May 28, 1954, Serial No. 433,101

3 Claims. (Cl. 6—7)

This invention relates to apparatus for capturing and collecting swarms of bees, and depositing in hives.

In this connection, it is well known that from time to time bees operating a going hive may move out with a newly produced queen bee in the hive, and then they swarm in different places, endeavoring to find a suitable location for their own new hive.

At this time it is necessary for the owner of the parent hive to capture and collect the bees so that they can be transferred to his own hive, usually of the box type, frequently seen from our roadways in the country.

Today the collection of swarming bees is no easy operation, and it is usually accomplished by the owner of the bees who holds a bag in one hand and attempts to brush the bees into the bag from the support on which they have swarmed. The brushing operation must be accomplished with great care because if a bee is roughly brushed or hurt he is apt to sting the operator of the brush.

A principal object of this invention is to provide a simple apparatus for accomplishing the capture and collecting of bees that have swarmed at a point outside of their former hive.

Another object of the invention is to provide simple means for accomplishing this, employing pneumatic means to induce an air current flowing into a casing or portable box through an orifice in its wall.

Another object of the invention is to provide such a portable trap or collecting casing for the bees, with means projecting from the casing and provided with an inlet mouth which can be readily presented at the location of the swarming bees without necessitating holding the side of the casing close to their location.

Another object of the invention is to construct such a projecting member or trunk, with a form that will insure that a relatively high velocity of air current will be induced in through the orifice or mouth of the trunk and thence into the casing, that will be strong enough to dislodge the bees, and cause them to ride on the air current into the interior of the casing; also to provide means within the casing that will stop the movement of the bees on the air current that carries them into the casing without injury to the bees as they alight within the casing of the apparatus; this is accomplished preferably by baffling the flow of the incoming air current in such a way that the bees will not be thrown violently against any obstruction in their path of movement.

Another object of the invention is to provide a trap-door or gate at the point where the incoming current of air enters the casing, which gate will open automatically when the air current is being induced to carry in the bees, but which will close automatically to prevent the bees passing out later through that orifice at which they entered.

In the preferred embodiment of the invention an exhaust fan is employed associated with the casing of the apparatus, which induces an air current flowing into the casing at a point in the wall oppositely located from the fan; and I provide the interior of the casing with a screen that will prevent the bees from passing into the fan; also to provide means mounted within the casing between the screen and the point of influx of the air current, that will function to baffle direct flow from the inlet point to the screened off outlet.

Further objects of the invention will be evident from a careful reading of the specification and a study of the accompanying drawing.

The invention consists in the novel parts and combinations of parts to be described hereinafter, all of which contribute to produce an efficient bee swarm collector.

A preferred embodiment of the invention is described in the following specification, while the broad scope of the invention is pointed out in the appended claims.

In the drawing:

Figure 2 is a vertical section taken approximately on the section line 2—2 indicated in Figure 3 of the drawing, but with the motor and fan casing indicated in side elevation.

Figure 1:
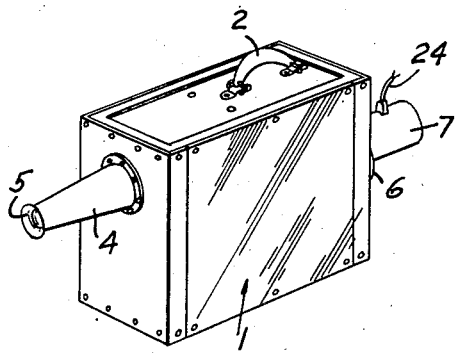
Figure 1 is a perspective of a preferred apparatus embodying this invention.
Figure 4:
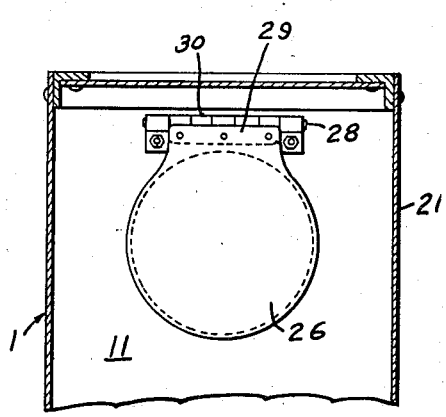
Figure 4 is a fragmentary view, and is a vertical section taken substantially in the plane of the section line 4—4 on Figure 2, and looking toward the left to show the trap-door through which the air current enters, carrying the bees.
Figure 3:
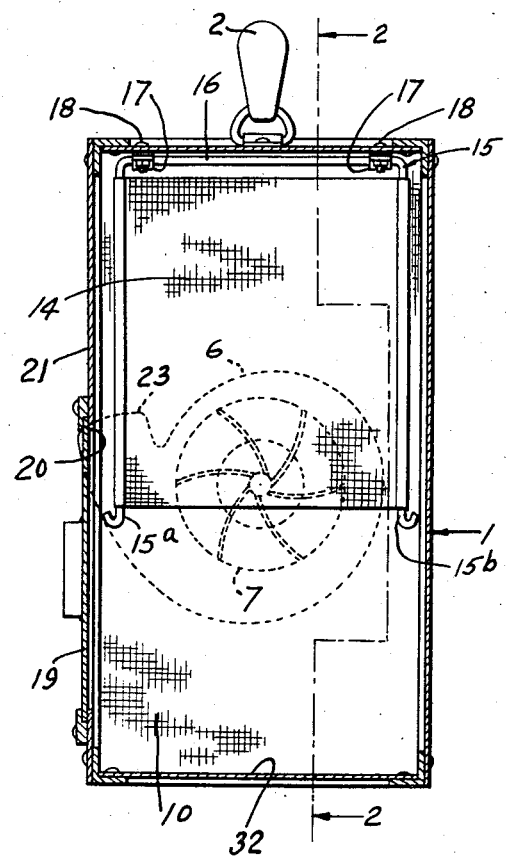
Figure 3 is a vertical cross-section taken substantially on the line 3—3 of Figure 2, and looking toward the right.

In practicing the invention a box form casing 1 is provided, that is preferably provided with a handle 2 for supporting the casing, and manipulating it to enable the bees to be drawn into the casing through the medium of pneumatic means associated with the casing.

For this purpose the casing is provided with an inlet orifice 3.

At this inlet orifice I prefer to mount a tubular member in the form of a relatively long snout or trunk 4.

This trunk preferably tapers down longitudinally toward its inlet end at which it is formed into an outwardly flared bell-mouth 5.

While any form of pneumatic means may be employed for inducing an inflowing air current at the forward end of the trunk, this may be accomplished by providing an exhaust fan and motor 7 for driving the same, connected to the casing 1 at an outlet orifice 8 in the rear wall 9 of the casing 1.

In the present instance the motor is illustrated as an electric motor that can be driven through an electric cord alternating or direct current or from a portable storage battery (not illustrated).

The interior of the casing 1 is preferably divided by a mesh-form screen 10 into a "prison" cell 11 and a vacuum chamber 12.

The screen 10 is preferably of wire mesh such as used for fly screening and, if desired, covered with a fabric layer on the side toward the cell 11. This wall may be of a character to cause diffusion of the flow of air from the cell 11 into the vacuum chamber 12.

Between the delivery end 13 of the tubular member 4 and the diffuser screen 10 it is preferable to provide a baffle 14 which includes a body of fabric material attached to a stout wire frame 15. This baffle presents a material, for example, a fabric, that will not harm or hurt bees that impinge upon the same while being delivered into the cell 11 on the incoming air current.

The frame 15 for the baffle is preferably adjustable as to its angle and location, so it is preferably formed of a wire having two forks 15a and 15b connected by a long wrist 16 mounted in two adjustable clamps 17 located respectively near the forks 15a and 15b. These clamps have two jaws (see Fig. 2) with grooves between which the wrist is socketed, and which are forced together by tightening up the screw bolts 18.

The nuts of these bolts are accessible when a slide door 19 is slid along to open the door-way 20 in the side wall 21 of the casing.

Figure 5:
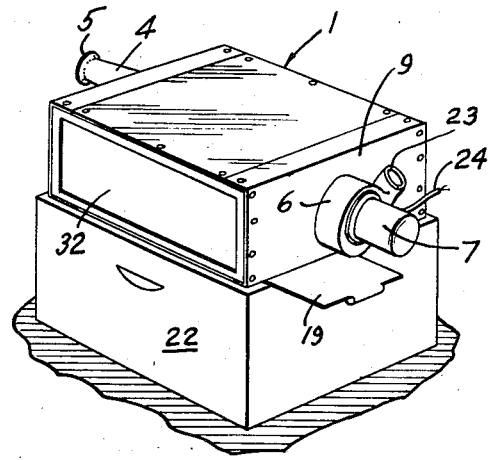
Figure 5 is a perspective illustrating the manner in which the bees collected in the apparatus can be conveniently transferred to their permanent home in a box-form hive.

Figure 5 illustrates how this sliding door 19 may be slid open when it is desired to transfer the trapped swarm from the casing 1 into a hive, for example, a box-form hive 22. This view also shows the fan casing 6 which withdraws air from the chamber 12, through the fan inlet 8, and delivers the air into the atmosphere through an outlet 23 from the fan casing. This view also shows the electric motor 7 with the electric cord 24 for leading the current to the same.

As shown in Figure 2, when the fan is in operation the current of air being inducted through the inlet horn 4 impinges upon the adjacent or outer face 25 of a plate-form lid or cover 26, and holds it away from its seat 27 at the long end of the conical horn, thereby causing the cover 26 to assume an inclined position which directs the current of air and the bees carried thereby downward toward the bottom 28 of the casing. As this occurs, of course, the air current expands into the space within the casing and loses its force, permitting the bees to fly, and light where they will. In this way any injury to the bees is prevented.

If any bees are carried by the current against the fabric screen 14 they will not be injured by reason of the relatively soft nature of the fabric of which the screen is composed.

The electric cord 24, in practice, has a switch (not illustrated) connected into the same, so that when the bees have all been picked up by the horn or trunk 4, the opening of the switch will stop the rotation of the fan; and when this occurs the lid or cover 26 will gravitate down to its normal position where it is shown in dotted lines in Figure 2. In order to assure that the cover 26 will remain closed when the collected bees are being transferred to the hive 22, I prefer to have the seat 27 on the large end of the trunk 4 located in an inclined plane such as shown in Figure 2; or, if desired, a weak coil spring 28a shown in Figure 2, is used at the hinge connection 28 which supports the upper edge portion 29 of the cover.

As indicated, the body of this cover may be of substantially circular form with the hinged portion 29 projecting upwardly from the same and presenting an horizontal edge 30 that adapts it for connection to the hinge pin.

A dry-cell or battery (not illustrated) may be provided to furnish the current for the fan. Such a battery would be provided with a handle for conveniently carrying it.

Many other embodiments of this invention may be resorted to without departing from the spirit of the invention.

I claim and desire to secure by Letters Patent:

1. In a bee swarm collector apparatus for catching and collecting swarming bees without injury to them, the combination of a portable casing having a wall with an orifice at the front of the casing for admitting atmospheric air into the same, and having a handle adapting the casing to be held supported so as to present said orifice adjacent to a swarm of bees, means located at the rear of the casing for developing a partial vacuum within the casing to induce a flow of current of air into the orifice capable of dislodging the bees and transporting them on the air current into the casing; said casing having an outlet for the admitted current of air, and a screen of relatively large area within the casing to bar passage of the bees through said outlet, a baffle in the path of the induced air current presenting a fabric material harmless to the bees when carried into the same by the air current for deflecting the said current over from the said screen and preventing the bees from being injured by being violently impinged upon the said screen, and a chamber back of the said screen in which the said partial vacuum is developed.

2. In a bee swarm collector apparatus, the combination of a casing having a forwardly disposed inlet opening, a forwardly extending tubular trunk attached to said casing at said opening, said trunk tapering from its rear end toward its forward end, and having a funnel shaped mouth at its forward end, a fan housing having an inlet attached to the rear side of said casing, an electric motor driven fan in said housing having a concentric inlet attached to the rear side of said casing for withdrawing air from the interior of said casing and inducing the air current in through the forward end of said trunk.

3. A bee swarm collector apparatus, according to claim 2, including means within the casing for preventing injury to the bees by reason of the velocity of the air carrying them on the air current.

References Cited in the file of this patent

UNITED STATES PATENTS

| | | |
|---|---|---|
| 173,002 | Harbison | Feb. 1, 1876 |
| 223,330 | Finley | Jan. 6, 1880 |
| 832,845 | Collins | Oct. 9, 1906 |
| 923,368 | Myser | June 1, 1909 |
| 1,006,271 | Powers | Oct. 17, 1911 |

FOREIGN PATENTS

| | | |
|---|---|---|
| 242,919 | Germany | Jan. 24, 1912 |
| 271,048 | Great Britain | Sept. 29, 1927 |